US012054600B2

(12) United States Patent
Varnell

(10) Patent No.: US 12,054,600 B2
(45) Date of Patent: Aug. 6, 2024

(54) COMPOSITIONS AND METHODS FOR IMPROVING ADHESION OF AN IMAGE TO A TREATED SUBSTRATE

(71) Applicant: SOLENIS TECHNOLOGIES, L.P., Wilmington, DE (US)

(72) Inventor: Daniel F. Varnell, Wilmington, DE (US)

(73) Assignee: Solenis Technologies, L.P., Wilmington, DE (US)

(*) Notice: Subject to any disclaimer, the term of this patent is extended or adjusted under 35 U.S.C. 154(b) by 39 days.

(21) Appl. No.: 17/353,890

(22) Filed: Jun. 22, 2021

(65) Prior Publication Data
US 2021/0403680 A1   Dec. 30, 2021

Related U.S. Application Data

(60) Provisional application No. 63/043,803, filed on Jun. 25, 2020.

(51) Int. Cl.
C08K 9/02 (2006.01)
C08K 3/22 (2006.01)
C08K 3/36 (2006.01)
C09D 179/00 (2006.01)
G03G 15/00 (2006.01)

(52) U.S. Cl.
CPC ............ C08K 9/02 (2013.01); C08K 3/22 (2013.01); C08K 3/36 (2013.01); C09D 179/00 (2013.01); G03G 15/6582 (2013.01); C08K 2003/2227 (2013.01); C08K 2201/005 (2013.01); C08K 2201/006 (2013.01); C08K 2201/011 (2013.01)

(58) Field of Classification Search
CPC ... C08K 9/02; C08K 3/22; C08K 3/36; C08K 2003/2227; C08K 2201/005; C08K 2201/006; C08K 2201/011; G03G 15/6582; C09D 179/00
See application file for complete search history.

(56) References Cited

U.S. PATENT DOCUMENTS

| 6,372,329 | B1 | 4/2002 | Graczyk et al. |
| 8,568,892 | B2 | 10/2013 | Zhao et al. |
| 10,372,051 | B2 | 8/2019 | Varnell |
| 10,613,449 | B2 | 4/2020 | Varnell |
| 2003/0207094 | A1 | 11/2003 | Carls et al. |
| 2005/0069718 | A1* | 3/2005 | Voss-Kehl ............ B82Y 30/00 428/447 |
| 2006/0210896 | A1* | 9/2006 | Jubran ................ C07D 333/76 549/48 |
| 2007/0031615 | A1* | 2/2007 | Nair ...................... G03G 7/008 428/32.38 |
| 2007/0032588 | A1 | 2/2007 | Hood |
| 2009/0036591 | A1* | 2/2009 | Jin ......................... C08K 3/36 524/612 |
| 2010/0297451 | A1 | 11/2010 | Zhao et al. |
| 2011/0115868 | A1 | 5/2011 | Chen et al. |
| 2012/0285528 | A1* | 11/2012 | Takanohashi ......... C08G 77/20 977/773 |
| 2015/0037520 | A1* | 2/2015 | Foster ................. B41M 7/0027 347/171 |
| 2015/0299482 | A1* | 10/2015 | Hemmes ............... D21H 19/40 524/47 |
| 2017/0335115 | A1* | 11/2017 | Seshadri ............... C09J 175/04 |
| 2017/0336725 | A1* | 11/2017 | Varnell ............... C09D 139/06 |
| 2018/0335711 | A1* | 11/2018 | Varnell ............... G03G 7/0006 |
| 2019/0302636 | A1 | 10/2019 | Varnell |
| 2022/0041874 | A1* | 2/2022 | Illsley ................. C09D 11/322 |

FOREIGN PATENT DOCUMENTS

WO   2012109140 A2   8/2012

OTHER PUBLICATIONS

David Saltman, et al., Pulp & Paper Primer, 2nd Edition, TAPPI Press (1998), pp. 24-25.
Nanomaterials (Basel). Jul. 2018; 8(7): 454. Published online Jun. 2, 2018. doi: 10.3390/nano8070454, Effects of Sample Preparation on Particle Size Distributions of Different Types of Silica in Suspensions.
Agnieszka Dudkiewicz et al: "A uniform measurement expression for cross method comparison of nanoparticle aggregate size distributions", ANALYST, vol. 140, No. 15, Jun. 9, 2015 (Jun. 9, 2015), pp. 5257-5267, XP055351095, UK ISSN: 003-2654, DOI: 10.1039/C5AN00561B.

* cited by examiner

Primary Examiner — David H Banh
(74) Attorney, Agent, or Firm — Lorenz & Kopf, LLP

(57) ABSTRACT

Compositions and methods that generally relates to treating a substrate and for improving adhesion of an image to a treated substrate and more particularly relates to systems and methods utilizing a combination of a poly tertiary amide, colloidal silica, and optionally a polymeric binder, for treating a substrate and for improving adhesion of an electrographic image to a treated substrate.

17 Claims, No Drawings

COMPOSITIONS AND METHODS FOR IMPROVING ADHESION OF AN IMAGE TO A TREATED SUBSTRATE

This application claims the benefit of U.S. Provisional application No. 63/043,803, filed 25 Jun. 2020, the entire contents of which are hereby incorporated by reference.

TECHNICAL FIELD

The present disclosure generally relates to compositions and methods for treating a substrate and for improving adhesion of an image to a treated substrate and more particularly relates to systems and methods utilizing a combination of a poly tertiary amide and colloidal silica for treating a substrate and for improving adhesion of an electrographic image to a treated substrate.

BACKGROUND

Liquid electrophotographic (LEP) printing uses a liquid ink for printing on substrates rather than using a dry, powder toner. Common examples of LEP printing machines are the HP Indigo Digital Presses. The toner particles in the liquid ink used in LEP printing are sufficiently small such that the LEP-printed images do not mask the underlying surface roughness/gloss of, for example, paper substrates. The liquid ink (also referred to herein as "ink", "liquid toner", or "LEP ink") used in LEP printing is a suspension of small pigment particles in the range of about 1 to 2 microns in a nonaqueous liquid. HP® Electroink® is a commonly used liquid ink for liquid electrophotographic printing. LEP printing is considered to give some of the best digital print quality images at a relatively rapid speed.

LEP printed images will not adhere to substrates as well as images printed using electroreprographic printing methods that utilize a dry-toner process. While conventional compositions have been applied to substrates in an attempt to improve adhesion of the image formed from liquid toner, further improvements are necessary due to (1) inconsistencies in adhesion performance depending on the grade of paper utilized as the substrate and (2) the difficulty in obtaining a near perfect (100%) adhesion of images printed from LEP printing as tested by HP® standard procedures, regardless of the grade of paper.

In a typical size press treatment of paper, a starch solution and additives are applied to the surface of the paper after initial drying. The treatment occurs in the size press section of a paper machine. The formed and once or partially dried paper is treated with a formulation comprising primarily of a water-based polymer solution or dispersion plus a binder such as starch. This is referred to as a size press treatment. Alternatively a finished and dried paper is treated with a composition comprising an adhesion promoting polymer solution or dispersion. This is sometimes referred to as a primer treatment. The treatment may be applied days or minutes or seconds before the printing process and may be done on a coater that is not part of the printing press or a coater that is part of the printing press. Drying occurs between the application of the composition and the printing. Primer treatments are applied to a variety of substrates from paper to plastic. In the typical manufacturing of what is termed "coated paper" in the paper industry a coating formulation comprising mostly fillers, such as clay, and binders, such as starch, is applied to a dried paper. For the current method, a composition including a tertiary polyamide and a colloidal silica can be applied as part of a size press formulation, or as a primer treatment or part of a primer treatment, or as part of a paper coating formulation.

Several different additives through the years have been applied to the surface of the paper with the starch or as a primer to give various properties from improved sizing (water resistance) to improved print quality to adhesion of electroreprographic printed images to surface strength. However, the combination of a poly tertiary amide, such as polyethyloxazoline (PEOx), and colloidal silica for size press, primer, or coated paper treatments is previous unknown and the benefits for adhesion of liquid toner unexpected. Colloidal silica alone does not provide the same benefits. In the current invention combinations of poly tertiary amide and colloidal silica replace the use of poly tertiary amide without the colloidal silica.

One solution for improving adhesion of HP Indigo Digital Press images is to treat the paper with polyethylene/acrylic acid. However, the polyethylene/acrylic acid was found to be inefficient, lead to deposits during the coating process and reduce the paper surface friction. Treatment with poly tertiary amides such as polyethyloxazoline and polyvinyl pyrrolidone were more efficient in many circumstances and they did not cause deposits or lower the friction. However, they were found to have less benefit on substrates or base sheets having an open or more porous structure. than a base sheet having a more closed or less porous structure. It was subsequently found that the addition of aluminum salts to the overcame the loss of efficiency.

However, addition of aluminum salts will significantly lower a solution pH and in some instances can cause deposition issues for paper size press formulations and in some instances interfere with the performance of optical brightening agents. Therefore, there is a need for other formulations that do not severely lower the pH of the paper machine size press formulation and that do not interfere with addition of anionic optical brightening agents.

Current studies have indicated that addition of colloidal silica with a polyethyloxazoline (PEOx) or other poly tertiary amides at a size press will give enhanced performance on an open base sheet and thus provide an option to replace the formulations currently being used in the industry. Likewise, a combination of PEOx or other poly tertiary amide (PTA) and colloidal silica have been found to enhance the adhesion of LEP printed images to a substrate more than PEOx or PTA or colloidal silica alone. Current studies have also indicated that colloidal silica does not give any benefit when used without PEOx or PTA.

Accordingly, it is desirable to provide systems and methods for treating a substrate and for improving adhesion of an image to a treated substrate. Furthermore, other desirable features and characteristics will become apparent from the subsequent summary and detailed description and the appended claims, taken in conjunction with the accompanying examples and the foregoing technical field and background.

SUMMARY OF THE DISCLOSURE

A water-based composition is provided for treating a substrate. The water-based composition includes an adhesion promoting polymer comprising a polymer containing one or more repeating units, wherein the one or more repeating units includes a tertiary amide group that comprises wherein the tertiary amide group is from about 70 mole % to about 100 mole % of the adhesion promoting polymer; a colloidal silica, and optionally a polymeric binder.

Also provided is a method for forming an image on a treated substrate. The method includes providing a substrate and applying a water-based composition to the substrate to form a treated substrate. The water-based composition includes an adhesion promoting polymer comprising one or more repeating units, wherein the one or more repeating units includes a tertiary amide group; a colloidal silica and optionally a polymeric binder.

In another non-limiting embodiment, a method for improving adhesion of an image to a treated substrate is provided herein. The method includes providing the substrate in which a composition is applied. The method further includes, but is not limited to, applying the composition to the substrate to form the treated substrate. The method further includes, but is not limited to, applying a liquid toner to the treated substrate to form the image on the treated substrate.

In another non-limiting embodiment, a printed material exhibiting improved adhesion of the image to the treated substrate is provided herein. The printed material includes, but is not limited to, a treated substrate. The treated substrate includes, but is not limited to, the substrate and a coating disposed on the substrate and formed from the composition. The printed material further includes, but is not limited to, the image disposed on the treated substrate and formed from the liquid toner.

DETAILED DESCRIPTION OF THE DISCLOSURE

The following detailed description is merely exemplary in nature and is not intended to limit the present disclosure or the application and uses thereof. Furthermore, there is no intention to be bound by any theory presented in the preceding background or the following detailed description.

Compositions and methods for treating a substrate and/or improving adhesion of a liquid toner to the substrate are provided herein. In some embodiments, a method for improving adhesion of an image formed from the liquid toner utilizing liquid electrophotographic printing (LEP printing) is provided herein. As used herein, "liquid electrophotographic printing" can be used interchangeably with "LEP printing", "electroreprographic printing with liquid toner particles", or "xerographic printing with liquid toner particles"; all of which encompass, for example, HP Indigo Digital presses and processes. Further, as used herein, liquid electrophotographic printing does not refer to or encompass the offset type printing process known as lithography and discussed in more detail in Alex Glassman, Printing Fundamentals, TAPPI Press, 1985, which is hereby incorporated herein in its entirety.

The composition applied to the substrate is a water-based composition that includes an adhesion promoting polymer, a colloidal silica and optionally a polymeric binder. The method includes the steps of providing a substrate, applying the water-based composition to the substrate to form a treated substrate, and applying a liquid toner to the treated substrate to form an image on the treated substrate.

In some aspects, the liquid toner includes a suspension of pigment or pigment-containing particles in a non-aqueous liquid. The liquid toner is applied to the treated substrate utilizing liquid electrophotographic printing.

The adhesion promoting polymer may include at least one repeating unit. Unless otherwise specified herein, the term "polymer", as utilized herein, refers to a polymer including one or more different monomeric units, which can encompass, for example, copolymers and terpolymers.

In some aspects of the adhesion promoting polymer, the repeating unit has a localized strong, negatively charged dipole (such as a carbonyl group) and no strongly positively charged dipole. As used herein, "localized strong, negatively charged dipole" means there is in the structure of the repeating unit a functional group such as a carboxyl group and herein "strong" is defined as having a local dipole moment of great than 2 dynes, where a carbonyl group is known to have a dipole of about 2.4 dynes in magnitude, the local dipole arising from differences in electronegativity of atoms bound together. Herein, having "no strongly positively charged dipole means there is no localized dipole (such as from a hydroxyl group) that has a dipole greater than 0.8 dynes in magnitude. The repeating unit may include, but is not limited to, a carbonyl group.

In other aspects of the adhesion promoting polymer, the at least one repeating unit includes a tertiary amide group. At least one of the carbon atoms bonded to the nitrogen atom of the tertiary amide group may have two or three hydrogen atoms bonded thereto, and the carbonyl group of the tertiary amide group may be bonded to a —CH, —CH$_2$, or —CH$_3$ group.

In yet other aspects of the adhesion promoting polymer, the at least one repeating unit is formed from a monomer selected from the group of vinylpyrrolidone, an oxazoline-containing monomer, N-vinyl piperidinone, N-vinyl caprolactam, N,N-dimethyl acrylamide, and combinations thereof. Preferably, the at least one repeating unit of the adhesion promoting polymer is formed from a monomer selected from the group of 2-ethyl-2-oxazoline, 2-methyl-2-oxazoline, and combinations thereof.

In some aspects, the adhesion promoting polymer may be a homopolymer. In other aspects, the adhesion promoting polymer may include poly(2-ethyl-2-oxazoline), poly(2-methyl-2-oxazoline), or combinations thereof. Preferably, the adhesion promoting polymer may include polyvinylpyrrolidone.

In other aspects, the adhesion promoting polymer may be additionally formed from one or more non-ionic monomers. For example, the adhesion promoting polymer may be formed from (i) one or more monomers selected from the group of vinylpyrrolidone, an oxazoline-containing monomer, N-vinyl piperidinone, N-vinyl caprolactam, N,N-dimethyl acrylamide, or combinations thereof, and (ii) one or more non-ionic monomers. The terminology "non-ionic monomer," as utilized herein, is one that does not have an anionic or cationic functionality under the conditions of use.

Small levels of ionic monomers, such as less than about 5 mole %, may be added. In some aspects, the anionic or cationic functionality comes from acrylic acids. In other cases the ionic functionality is from an amine, or is based on ethylene imine.

The adhesion promoting polymer may be additionally formed from one or more monomers that do not strongly lead to hydrogen bonding with itself, either with itself in the same polymer chain or between polymer chains. In other words, the adhesion promoting polymer may be substantially free of monomers that are capable of leading to a strong degree of self-association of the adhesion promoting polymers. The terminology "substantially free," as utilized herein with regard to the monomers that are capable of leading to a strong degree of self-association, means that the adhesion promoting polymer is formed from less than about 5% and less than about 1 wt. % of monomers that, when polymerized, are capable of leading to a strong degree of self-association. The terminology "strong degree of self-association," as utilized herein means significant hydrogen bonding of the adhesion promoting polymer with itself or a high degree of dipole-dipole interactions of the adhesion promoting polymer with itself. For a discussion of interactions between monomer units in a polymer, and one polymer with another polymer or with a solvent, refer to Chapter 12 of Paul Flory's classic work "Principles of Polymer Chemistry, first published in 1953 by Cornell Press. He defined an interaction parameter that expressed "the first neighbor interaction free energy." Others have expanded greatly on the concept since Flory's work. Those familiar with the concept will recognize that the point being made here is that the polymer additives of this disclosure have the trait of having little self-association, on a relative basis, versus other polymers and more importantly (although not meaning to be bound by theory), they are polymers that will interact on a molecular level more strongly with the polymer of the liquid toner than with themselves.

In some aspects, the adhesion promoting polymer may be water-dispersible or water soluble. The adhesion promoting polymer can be water soluble. Water solubility can be defined in various ways. In the current application, water-soluble means the material is at least about 80% soluble in water at room temperature, although heat may be used to assist getting the polymer into solution. Water soluble can also mean that the polymer is dissolved to a concentration of at least about 5% in water. Water solubility can also be defined as a certain level of hydrophobicity. Solubility also implies that the material is not crosslinked to an extent to prevent the molecular chains from separating in water.

The adhesion promoting polymer of the composition can have a weight average molecular weight greater than about 40,000 Daltons, alternatively greater than about 80,000 Daltons, alternatively greater than about 190,000 Daltons, or alternatively greater than about 450,000 Daltons, wherein the upper boundary is an average molecular weight that would prevent the formation of a solution including the adhesion promoting polymer.

In some aspects of the current composition, the composition is water-based and has a solids of from about 2% to about 50% solids by weight, can be from about 3% solids to about 30% solids by weight, can be from about 4% solids to about 25% solids by weight, and may be from about 5% solids to about 20% solids by weight.

The solids are determined by the amount of material to be applied to a substrate and viscosity limitations based on the method of application. The solids portion comprises a "adhesion promoting polymer" and a colloidal silica. The level of components will vary based on the amount of the composition that can and is applied to the substrate and the levels of each component needed to impart the desired final property of improved electroreprographic image adhesion. The levels of the "adhesion promoting polymer" and the colloidal silica on the substrate and the ratio of these two components have been found to greatly impact performance. It is appreciated that the composition may include more than one type of "adhesion promoting polymer" and more than one type of colloidal silica".

In some aspects of the composition, the solids of the composition is greater than about 3% by weight and has a viscosity of less than about 1000 centipoise (cps), can have a solids of greater than about 4% by weight and a viscosity of less than about 500 cps, and may have a solids of greater than about 5% by weight and a viscosity of less than about 200 cps.

In some aspects, the composition is used on size press treated paper. The level of the adhesion promoting polymer on a dry weight percent basis to paper, can be from about 0.1% to about 1% by dry weight of the paper, can be from about 0.15% to about 0.7% by dry weight of the paper; and the level of colloidal silica can be from about 0.1% to about 1% by dry weight of the paper and can be from about 0.15% to about 0.7% by dry weight of the paper. The ratio of the "adhesion promoting polymer" to the silica is from about 1:1 to about 1:0.2, can be from about 1:1 to about 1:0.5, or may be from about 1:0.7 to about 1:0.5.

In other aspects, treatment of paper to form coated paper as part of a coating formulation shall be the level of-adhesion promoting polymer on a dry weight percent basis of the paper coating shall be from 2% to 10% of the coating formulation or from 3% to 5% of the coating formulation. In various non-limiting embodiments, all values and ranges of values, both whole and fractional, including and between all of the aforementioned values are hereby expressly contemplated for use herein.

In some aspects of treating the substrate, the composition remains predominantly at the surface, such as where greater than 50% of the solids portion of the composition penetrates less than 10 microns into the substrate. In this respect, the amount of adhesion promoting polymer on a dry weight basis applied to the substrate on each side of the treated substrate can be in a range of from about 0.0075 gsm to about 0.375 gsm, or from 0.0115 gsm to about 0.165 gsm, or from about 0.015 gsm to about 0.095 gsm, or from about 0.015 gsm to about 0.04 gsm of the substrate on a dry weight basis. The level of colloidal silica can be from about 0.02 gsm to about 1.3 gsm. The amounts are based on the total amount of the adhesion promoting polymers and colloidal silica applied to the substrate not the total composition applied. The ratio of the "adhesion promoting polymer" to the colloidal silica can be from about 1:2 to about 1:0.2, or from about 1:1 to about 1:0.5, or from about 1:0.7 to about 1:0.5. In various non-limiting embodiments, all values and ranges of values, both whole and fractional, including and between all of the aforementioned values are hereby expressly contemplated for use herein.

In some aspects of the composition, the colloidal silica can have a surface charge that is either cationic or anionic.

In other aspects of the composition, the colloidal silica has an average particle size of less than about 150 nanometers, can be less than about 100 nanometers and can be less than about 25 nanometers.

In other aspects, average particle size of the colloidal silica is between about 0.4 and 120 nanometers, and can be between about 1 nanometer and 100 nanometers.

In other aspects of the composition, the colloidal silica can have a surface area greater than about 50 $m^2/g$, can be greater than about 100 $m^2/g$, can be greater than about 200 $m^2/g$ and may have a surface area greater than about 220 $m^2/g$. In various non-limiting embodiments, all values and ranges of values, both whole and fractional, including and between all of the aforementioned values are hereby expressly contemplated for use herein.

In yet other aspects of the composition, the colloidal silica particles are alkaline.

In yet still other aspects of the composition, the colloidal silica surface is a reaction product of an aluminum chlorohydrate compound and the colloidal silica surface The inclusion of the colloidal silica in the composition provides unexpected improvements for adhesion of the liquid toner to the substrate as compared to a composition free of the colloidal silica. The colloidal silicas affects the efficacy of the adhesion promoting polymer providing unexpected results. When the colloidal silicas are used without the adhesion promoting polymers, the improvement in adhesion of liquid toner images is not seen.

In other aspects of the composition, the composition optionally includes a polymeric binder, such as a water-soluble hydroxyl-functional polymer. The binder may include a polyvinyl alcohol, a starch e.g., an oxidized starch, a cationized starch, an ethylated starch, an esterified starch, and an enzymatically denatured starch), a gelatin, a casein, a protein (e.g., a soybean protein), a carboxy-methyl cellulose, a hydroxyethyl cellulose. The binder may also be such polymers as an acrylic emulsion, a vinyl acetate emulsion, a vinylidene chloride emulsion, a polyester emulsion, a styrene-butadiene emulsion, an acrylonitrile-butadiene latex, or combinations thereof. The binder may be an acrylamide-based polymer such as an acrylamide-acrylic acid copolymer. The binder can be an organic binder.

In some aspects, the optional binder is a starch chosen from an oxidized starch, a cationized starch, an ethylated starch, an esterified starch, an enzymatically denatured starch, and combinations thereof.

The composition may include the optional binder in an amount of from 0 to about 98 wt. % of the total composition, can be from about 5 wt. % to about 90 wt. % of the total composition and may be from about 10 wt. % to about 80 wt. % of the total composition. However, the viscosity of the composition plays a role and must be suitable for application by the method selected and also, a viscosity that provides the level of application of the composition that is desired. Furthermore, the ratio of the adhesion promoting polymer and colloidal silica also can play a major role in the efficacy of the composition.

The desired viscosity of the composition will be dependent on the method used for applying the composition to a substrate. It will also be dependent on the concentration of the components of the composition and the desired final level of the composition. The desired viscosity is dependent on the particular size press equipment and other factors such as the speed of the paper machine or coater and can be adjusted dependent upon the machine.

In some aspects, the composition may further include additional additives for improving the adhesion of the liquid toner printed on a substrate via LEP printing. Non-limiting examples of the additional additives include poly(ethylene acrylic acid) and polyethylene imine and polymers based or containing these materials. The amount of carboxylic acid-containing polymer and amount of colloidal silica must be such that the composition remains uniform. It is well known that multivalent salts can coagulate dispersions, especially those with carboxylic acid polymers, and can also precipitate solution of carboxylic acid-containing polymers.

In yet other aspects of the composition, the composition can further include additional additives as known in the art including, but not limited to, fillers, defoamers, waxes, pigments, dyes, paper sizing agents, biocides, rheology modifiers, rosin derivatives, surfactants, solvents, plasticizers, or combinations thereof. Rheology modifiers that can be used can include almost any material known to modify the rheology of a water-based solution such as a cellulosic based thickener like carboxymethyl cellulose or hydrophobically modified hydroxyl ethyl cellulose or alginate-based thickeners or starch-based thickeners or high molecular weight polymers, pectins, associative thickeners, and the like. The rheology modifier may be solutions or may be a dispersion such as a modified starch, for example Ecosphere materials from Ecosynthetix. Dispersions may act on paper surfaces to block the porous nature of paper and thus hold the active adhesive enhancing additives at the surface of the paper. Rheology of coating and treatment solutions can also be modified by combinations of materials that may form hydrogen bond or ionic complexes. The limitation of rheology modifiers is dictated by the ability of the composition to be applied to a substrate in a consistent manner. For example, there are viscosity limitations for size press compositions to be used on a paper machine size press. Modifiers or additional additives should not detract from the purpose of the composition to extent that adhesion of printed images is greatly reduced.

In some aspects, the order of addition of the adhesion promoting polymer, the colloidal silica and the optional binder to form the composition, may impact performance of the composition. To this end, when a binder is used in the composition, the materials may be added one at a time, with mixing, to the binder. For example, one could start with a starch solution, and add to it the adhesion promoting polymer and then separately add the colloidal silica. The materials may be added as water solutions or water-based dispersions to aid mixing, shorten mixing time, and reduce occurrences of unfavorable interactions of concentrated solutions.

As introduced above, a method for treating the substrate is provided herein. The method includes the steps of providing the substrate and applying the composition to the substrate to form the treated substrate. In one embodiment the step of applying the composition to the substrate includes the steps of transferring the composition as a water-based solution or dispersion or both to the size press of a paper machine where it treats a paper substrate. In another embodiment, the step of applying the composition to the substrate includes the step of providing an applicator roll, applying the composition to the applicator roll, and contacting the substrate and the applicator roll to form the treated substrate. It is to be appreciated that the composition may be applied to the substrate utilizing any suitable method as would be known to a person of ordinary skill in the art so long as the method results in a substantially uniform treatment across the surface of the substrate. Such methods include, for example, but are not limited to, using the size press equipment typically utilized with paper machines, spray coating, foam coating, curtain coating, roller coating, printing, transfer coating from a substrate or combinations thereof.

Treatment of the substrate can be at least a portion of at least one surface of a substrate. Coating may refer to treatment of paper at a size press or some other mechanism as just described. For what the paper industry defines as uncoated paper, size press treatment of the paper is normally referred to as a size press treatment. Coating in the paper industry may refer to the materials and process classically defined in the paper industry for the preparation of "coated paper" and the terminology "coating", as utilized herein, may reference treatments to paper or woven or non-woven substrates that would be referred to as coated paper and may include at least a composition including the binder, the adhesion promoting polymer, and the colloidal silica. It can also include one or more components as would be known by a person of ordinary skill in the art to be beneficial in coating a substrate (e.g., a paper substrate) to enhance the substrate and/or the print quality of an image printed thereon. For example, "coated paper" is typically a paper with a layer of particulate inorganic fillers such as calcium carbonate or clay held on the surface by a binder. Thus, coated paper is a category of paper that has fillers held in a "coating" on the surface by a binder. The term is well known in art related to the paper industry and printers. See David Saltman, et al., Pulp & Paper Primer, 2nd Edition, TAPPI Press (1998) at, for example but without limitation, pages 24-25, which is hereby incorporated by reference herein in its entirety. The treatment of the substrate by the composition may also occur after the substrate is formed and dried or in the case of plastic, surface modified my means such as corona treatment, for example when paper is made, and dried or coated to make "coated paper". Such an application to the final substrate maybe as a final step before printing and may be called a primer treatment. For example, the substrate may pass through an anilox roll coater to apply the composition then be dried and then be printed within days, hours, or even seconds of being printed.

The substrate may be selected from the group of a paper product, a woven fibrous material, a non-woven fibrous material or non-woven non-fibrous substrates such as a plastic film, and combinations thereof. However, it is to be appreciated that any substrate known in the art compatible with LEP printing may be utilized. Three primary types of substrates printed with LEP printers are well known and include: 1) uncoated paper; 2) coated paper; and polymeric substrates. Uncoated paper and coated paper are well defined terms in the paper industry, although there can be variations on these and other paper surfaces that can be LEP printed. In certain embodiments, the substrate is a paper product, and the paper product is uncoated.

The paper product may be in any orientation as would be known by a person of ordinary skill in the art, such as one or more rolls, cut sheets, and/or various shapes and configurations capable of being printed by a digital LEP printer. The substrate may be uncoated paper, such as that typically used in offices for electroreprographic printing. The substrate may be coated paper such as used in higher quality printed items. The substrate may be grades of paper used in packaging, and such grades could be uncoated or coated paper. The substrate may be a woven substrate or nonwoven substrate and those may be of cellulosic based materials other natural products or fabricated products. The substrate can also be any other substrate compatible with the LEP printing process as would be known by a person of ordinary skill in the art. However, the formulation for each type of substrate can vary in that a binder may or may not be used, and if used the binder may be significantly different. It is significant in how the composition penetrates into the substrate for this will influence the needed levels of binder, adhesion promoting polymer and colloidal silica, as well as possibly the use of other components such as rheology modifiers. For example, for a very porous substrate the composition may require a higher level of colloidal silica than for a non-porous substrate and the viscosity of the composition may need to be greater.

The nature of the substrate can also affect the step of applying the composition to the substrate. In addition, any treatment of the substrate prior to applying the composition can have an effect on the methods for applying the composition, the amount of the composition, and/or the ratio of the adhesion promoting polymer and colloidal silica. For example, if the substrate is porous, such as for uncoated untreated paper, the composition may soak into the substrate, possibly completely but at least partially, and the amount of the composition may need to be increased as more material soaks into the sheet. That is, the amount of the composition (in particular, the amount of the adhesion promoting polymer and the colloidal silica) applied to a substrate to result in the desired improvement in adhesion may be dependent on the properties of the substrate. Further, the nature of the binder and other additives of the composition, and the viscosity of the composition may also impact the amount of composition that may soak into the substrate. Even with an uncoated paper, a viscous composition may minimally penetrate the paper. For treatment of a nonporous coated substrate, the composition may be part of a coating composition including fillers or pigment particles and the coating composition may be applied to the surface of the paper to form a layer on the substrate. For coated paper, the composition may also be applied to the surface of the paper after the paper has been treated to make it less porous. Regardless of the nature of the substrate, the composition may form an ink-receiving layer to which ink will come in contact with during the printing process and to which the image from the ink may adhere.

The method in which the composition is applied to the substrate can impact the distribution of and the amount of the composition needed to obtain the desired improvement of image adhesion. In aspects where the composition soaks substantially into the substrate, the amount of the composition applied to the substrate is generally described in terms of weight percent of the substrate. However, for cases, such as relatively non-porous substrates or where the surface of the paper is a more closed structure where the composition remains substantially at the surface of the substrate, such as in embodiments including coated paper where the composition does not soak substantially into the substrate, the amount of composition applied to the substrate is generally described as the amount of composition applied to the surface of the substrate in terms of composition weight per the surface area treated (such as grams per square meter).

In one aspect, the substrate is a paper product and the amount of the adhesion promoting polymer on a dry weight percent basis to paper, can be from about 0.1% to about 1% by dry weight of the paper, can be from about 0.15% to about 0.7% by dry weight of the paper; and the level of colloidal silica can be from about 0.1% to about 1% by dry weight of the paper and can be from about 0.15% to about 0.7% by dry weight of the paper. The ratio of the "adhesion promoting polymer" to the silica is from about 1:1 to about 1:0.2, can be from about 1:1 to about 1:0.5, and may be from about 1:0.7 to about 1:0.5.

In yet other aspects, the substrate can be a relatively non-porous substrate or paper with a closed surface and the amount of the composition comprising adhesion promoting polymers and colloidal silicas. In the case of a relatively non-porous substrate the amount of addition of adhesion promoting polymer is from about 0.0075 gsm to about 0.375 gsm, can be from about 0.0115 gsm to about 0.165 gsm, can be from about 0.015 gsm to about 0.095 gsm, and may be from about 0.015 gsm to about 0.04 gsm of the substrate on a dry weight basis. The amount of the colloidal silica applied to the paper product may be in an amount of from about 0.004 gsm about 0.2 gsm, and can be from about 0.005 gsm to about 0.15 gsm based on a total weight of the substrate on a dry weight basis.

In some aspects of the method, the composition being applied to the substrate has a ratio of adhesion promoting polymer to colloidal silica of from about 1:2 to about 1:0.2, or from about 1:1 to about 1:0.5, or from about 1:0.7 to about 1:0.5. In various non-limiting embodiments, all values and ranges of values, both whole and fractional, including and between all of the aforementioned values are hereby expressly contemplated for use herein.

In another aspect, a printed material exhibiting improved adhesion of the image to the treated substrate is also provided herein. The printed material includes the treated substrate and the image disposed on the treated substrate and formed from the liquid toner. The treated substrate includes the substrate and the coating. The coating is disposed on the substrate and formed from the composition.

In some aspects of the method, the image applied to the treated substrate, such as a 100% black image, or a 290% composite black image (as used for HP® testing), has an adhesion retention to the treated substrate of greater than about 80%, can be greater than about 85%, can be greater than about 90%, and may be greater than 95% in accordance with the Tape Pull Test using 3M 230 drafting tape. The Tape Pull Test is a test developed by the Rochester Institute of Technology (RIT) using a standard HP procedure for the HP Indigo 7000 series Digital Presses. Currently the test calls for use of 3M 232 masking tape. It replaces the use of 3M 230 tape and there is built into the procedure corrections for the change in type of tape. In another embodiment the reported adhesion from RIT is greater than 95%.

In another aspect, the image formed from a 290% black liquid toner was determined to have an adhesion retention to the treated substrate of greater than 80%, in some instances greater than 90%, in yet other instances adhesion retention was determined to be greater than 95% by RIT, per the test method described above.

EXAMPLES

The following tests were performed by the Rochester Institute of Technology (the North American test site for qualifying paper treatments for Indigo printing) in compliance with the standard test procedures set forth by HP for testing the adhesion of ink coated with one of their Indigo Digital Presses as described below.

Test Method for Measuring Adhesion

The test method used in the following examples was the standard method for determining adhesion of HP Indigo digital printed images to substrates wherein black rectangle images of 100% black liquid toner were printed using an HP Indigo 7000 Digital series press in a 4-shot mode, using standard temperature settings, to provide the test pattern. Black rectangular images were also printed using the same printer and settings, but the black liquid toner was composed of 52 parts yellow, 66 parts magenta, 72 parts cyan, and 100 parts black toner, which are commonly referred to as 290% photo images. The latter test is the more severe test.

Ten minutes after printing the above-described images, the images were tested by Rochester Institute of Technology (RIT), using the standard HP test and an Indigo 7000 Digital series press, for adhesion to a substrate with a tape test using 3M™ 230 or 232 tape and a 2 kilogram (kg) weighted roller to apply force uniformly and consistently. The percent of the image not removed by peeling off the tape was measured. Within any example only one of the tapes (either 3M™ 230 or 232 tape) was used and only one standard procedure of HP® was used by MT. The adhesion values reported in this patent were the adhesion values reported by MT. Testing was also done 60 minutes after printing. Adhesion generally improves with a longer hold-time before testing.

Example 1: Image Adhesion

Exemplary and comparative printed materials were formed and evaluated to determine the effect on LEP print adhesion (image adhesion) of paper additives added to the paper at a size press using a Dixon coater (Emerson & Remwick Ltd). The amounts of materials used were adjusted based on the pick-up or how easily the substrates absorbed starch solutions. The starch solutions used to treat the paper were at a temperature of between 50° C. and 55° C. at the time of treatment.

A roll of uncoated fine paper suitable for offset or LEP printing was premade and used as the base substrate. This base paper was made on a commercial paper machine and was made without size press treatment. The paper used in the current examples had internal sizing from alkyl succinic anhydride and contained about 25% precipitated calcium carbonate filler. The paper was fed through the Dixon coater with a puddle size press mode such that the paper was treated on both sides with a starch solution. In the process, the paper continued to pass through the Dixon coater to be dried and wound on a reel.

Results of the various formulations can be seen in Table 1. In the current example, 0.3% (6 #/ton) of imPress™ ID-115, Solenis, LLC, (a polyethyloxazoline based polymer) with 40 #/ton starch (Sample 2) was shown to improve the image adhesion over the starch alone (Sample 1) of 32%. Results showed a 49% improvement in image adhesion when 0.2% (4 #/ton) of PerForm™ PB9007 (Sample 3), a polyaluminum chlorohydrate (PAC) was added to the imPress ID-115 and starch formulation of Sample 2 over Sample 1 (starch alone). Similar improvements were seen when the PerForm™ PB9007 was replaced by both Ludox™ CL colloidal silica and Ludox™ AM-30 (see Samples 4-6). All Ludox™ products were obtained from W.R. Grace and Company. Results indicated enhanced adhesion performance can be seen with the addition of colloidal silica to the formulation.

TABLE 1

Uncorrected % Ink Adhesions

| Sample | Additive | Uncorrected % ink adhesion |
|---|---|---|
| 1 | None | 57 |
| 2 | None | 75 |
| 3 | 0.2% PerForm ™ PB9007 | 85 |
| 4 | 0.1% Ludox ™ CL | 83 |
| 5 | 0.2% Ludox ™ CL | 82 |
| 6 | 0.2% Ludox ™ AM-30 | 81 |

Example 2: Uncorrected % Ink Adhesion

The processes and conditions used in Example 1, were used in the following example The level of imPress™ ID-115 (polyethyloxazoline based polymer) was kept constant at 6 #/ton except for in Sample 1, which is a control sample with starch alone and no imPress™ ID-115. The 10-minute adhesion with 290% ink coverage test used in Example 1 was used here for comparison. As above, all tests were run at the RIT. The results shown in Table 2, show the uncorrected % ink adhesion.

TABLE 2

Uncorrected % Ink Adhesions

| Sample | Additive | Uncorrected % ink adhesion |
|---|---|---|
| 1 | Starch | 66 |
| 2 | imPress ™ID-115/Starch control | 79 |
| 3 | 0.2% PAC | 87 |
| 4 | 0.1% Ludox ™ CL | 79 |
| 5 | 0.2% Ludox ™ CL | 88 |
| 6 | 0.2% Ludox ™ AM | 86 |
| 7 | 0.2% Ludox ™ TM40 | 84 |

TABLE 2-continued

Uncorrected % Ink Adhesions

| Sample | Additive | Uncorrected % ink adhesion |
|---|---|---|
| 8 | 0.2% Ludox ™ LS | 86 |
| 9 | 0.2% Ludox ™ TMA | 83 |
| 10 | 0.2% Ludox ™ AS-40 | 88 |
| 11 | imPress ™ ID-115 control | 79 |

Results of this study shows that levels above 0.1% (3 #/ton) colloidal silica are required to improve the image adhesion. At levels of 0.2% (4 #/ton), a large variety of colloidal silica materials improved the adhesion. Ludox™ colloidal silicas are products of WRGrace and Company. The improved adhesion was unexpected.

Example 3

The surface of a commercial paper was treated with a formulation that included an ethylated starch, imPress™ ID-115 (polyethyloxazoline) and colloidal silica (Samples 3-7). In addition, a sodium chloride solution and an optical brightening agent was added to each formulation. The NaCl and OBA were added at levels to give weight % in the final dry paper. The level of addition of the ethylated starch was weight % of the final dry paper. Table 3, provides the levels of PEOx, type of silica, and level of silica. The samples were tested for adhesion of images printed with an Indigo 7000 series press in what is known as a 4-shot mode where each of four colors is printed sequentially, as 52 parts yellow, 66 parts magenta, 72 parts cyan, and 100 parts black toner. Total ink coverage was 290% as in previous examples and as directed by HP for testing of image adhesion. Adhesion was measured after 10 and 60 minutes by the same tape test as in Examples 1 and 2.

TABLE 3

| Sample | % PEOx | Type of Silica | Average Particle size (nm) | Surface Area (gsm) | Silica characteristics | % Silica | 10 min. adhesion (% ink retention) | 60 min. adhesion (% ink retention) |
|---|---|---|---|---|---|---|---|---|
| 1 | 0 | none | NA | | NA | 0 | 57 | 61 |
| 2 | 0.3 | none | NA | | NA | 0 | 81 | 89 |
| 3 | 0.3 | imPress ™ AS-450 | 120 | | Alkaline | 0.2 | 89 | 93 |
| 4 | 0.3 | PW-50 EC | 40 | 60-90 | Anionic, Alkaline, Sodium counter ion | 0.2 | 85 | 94 |
| 5 | 0.3 | imPress ™ AS-452 | NA | NA | Colloidal silica | 0.2 | 86 | 88 |
| 6 | 0.3 | Sylojet ® C30E | 0.4 | 150-200 | Not colloidal High surface area porous | 0.2 | 82 | 88 |
| 7 | 0.3 | Zeolite | <45 | | Microporous Aluminosilicate | 0.2 | 85 | 84 | imPress AS-450 and AS-452 were colloidal silica products of Solenis, LLC.

PW-50 EC is a larger particle colloidal silica provided by W.R. Grace and Company Silica particle sizes and surface areas were reported by the manufacturer of the silica products and their values are reported in this document. Particle size is generally determined by light scattering from a dilute solution with equipment such as described in Nanomaterials (Basel). 2018 July; 8(7): 454. Published online 2018 Jun. 21. doi: 10.3390/nano8070454, Effects of Sample Preparation on Particle Size Distributions of Different Types of Silica in Suspensions, Rodrigo R. Retamal Marin,[1,*] Frank Babick,[1] Gottlieb-Georg Lindner,[2] Martin Wiemann,[3] and Michael Stintz[1]. Surface area is generally determined by methods such as ASTM D5604-96.

Results of the study, considering both 10-minute and 60-minute adhesion, indicates that the addition of colloidal silica to the formulation (Samples 3 and 4) showed improvement of adhesion when compared with the control (Sample 2). As can be seen by Sample 6, a non-colloidal silica having a particle size of 0.4 nm showed no improvement in adhesion from the control. Finally, results showed that a microporous aluminosilicate (Sample 7) does not provide an improvement of adhesion, as clearly seen in the 60-minute test.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. A water-based coating composition for treating a liquid electrophotographic printing substrate wherein the water-based coating composition comprises:
an adhesion promoting polymer; a colloidal silica in an amount of from about from about 0.1% to about 1% by dry weight of the substrate; and a polymeric binder selected from a polyvinyl alcohol, a starch, a gelatin, a casein, a protein, a carboxy-methyl cellulose, a hydroxyethyl cellulose; wherein the adhesion promoting polymer comprises one or more repeating units that includes a tertiary amide group, wherein the tertiary amide repeat units are from about 70 mole % to about 100 mole % of the adhesion promoting polymer; and wherein the ratio of the adhesion promoting polymer to the colloidal silica is from about 1:1 to about 1:0.2.

2. The water-based composition of claim 1, wherein the water-based composition has a solids of greater than about 3% by weight and a viscosity of less than about 1000 cps.

3. The composition of claim 1, wherein the one or more repeating units of the adhesion promoting polymer is formed from a monomer selected from the group of vinylpyrrolidone, an oxazoline-containing monomer, N-vinyl piperidinone, N-vinyl caprolactam, N,N-dimethyl acrylamide, and combinations thereof.

4. The composition of claim 3, wherein the one or more repeating units of the adhesion promoting polymer is formed from a monomer selected from the group of 2-ethyl-2-oxazoline, 2-methyl-2-oxazoline, and combination thereof.

5. The composition of claim 3, wherein the adhesion promoting polymer is a polyethyloxazoline.

6. The composition of claim 1, wherein the colloidal silica has an average particle size of less than about 150 nanometers.

7. The composition of claim 6, wherein the colloidal silica has an average particle size of from about 0.4 to about 120 nanometers.

8. The composition of claim 1, wherein the colloidal silica has a surface area of greater than about 50 $m^2$/g.

9. The composition of claim 1, wherein the colloidal silica surface is a reaction product from an aluminum chlorohydrate compound and the colloidal silica surface.

10. The composition of claim 1, wherein the polymeric binder comprises from 0 to about 98 wt. % of the total composition.

11. A method for treating a paper substrate for improved liquid electrographic image adhesion comprising:
   a. providing a paper substrate;
   b. applying a water-based composition to the paper substrate at a size press to form a treated substrate, the composition comprising: an adhesion promoting polymer containing one or more repeating units that includes a tertiary amide group, and the tertiary amide repeat units are from about 70 mole % to about 100 mole % of the adhesion promoting polymer; a colloidal silica in an amount of from about 0.1% to about 1% by dry weight of the substrate; and a polymeric binder selected from a polyvinyl alcohol, a starch, a gelatin, a casein, a protein, a carboxy-methyl cellulose, a hydroxyethyl cellulose, an acrylonitrile-butadiene latex, and combinations thereof; and wherein the ratio of the adhesion promoting polymer to the colloidal silica is from about 1:1 to about 1:0.2;
   c. drying the treated substrate; and
   d. applying a liquid toner to the treated substrate to form the image on the treated substrate.

12. The method of claim 11, wherein the substrate is a paper product having a relatively non-porous surface and wherein the amount of adhesion promoting polymer applied to the surface of the substrate is from about 0.0075 gsm to about 0.375 gsm, based on the total weight of the substrate on a dry weight basis; and the amount of the colloidal silica applied to the surface of the substrate is from about 0.004 gsm about 0.2 gsm based on the total weight of the substrate on a dry weight basis.

13. The method of claim 11, wherein the substrate is selected from paper products, fiber mats, woven fibrous materials, non-woven fibrous materials, plastic films, and combinations thereof.

14. The method of claim 11, wherein:
   a. the adhesion promoting polymer is applied to the substrate in an amount of from about 0.1% to about 1% by dry weight of the paper,
   b. the colloidal silica is applied to the substrate in an amount of from about 0.1% to about 1% by dry weight of the paper.

15. The method of claim 11, wherein less than 50% of the solids of the composition applied to the surface of the substrate penetrates more than 10 microns into the substrate.

16. A method for improving adhesion of an electrographic image to a treated substrate comprising:
   providing a substrate;
   applying a composition to the substrate comprising an adhesion promoting polymer containing one or more repeating units that includes a tertiary amide group, and wherein the tertiary amide repeat units are from about 70 mole % to about 100 mole % of the adhesion promoting polymer; and a colloidal silica in an amount of from about 0.1% to about 1% by dry weight of the substrate; and wherein the ratio of adhesion promoting polymer to the colloidal silica of from about 1:1 to about 1:0.2 thereby forming the treated substrate;
   applying a liquid toner to the treated substrate to form the electrographic image on the treated substrate.

17. The method of claim 16, wherein the formed image on the treated substrate has an adhesion retention to the treated substrate of greater than about 80%.

* * * * *